(No Model.)

H. E. WALTER.
DYNAMO ELECTRIC MACHINE.

No. 351,544. Patented Oct. 26, 1886.

ATTEST:
E. C. Rowland
H. W. Riddle

INVENTOR:
Henry E. Walter
By Dyer & Seely
Attys

United States Patent Office.

HENRY E. WALTER, OF CLIFTON, ASSIGNOR OF ONE-HALF TO CHARLES BATCHELOR, OF NEW YORK, N. Y.

DYNAMO-ELECTRIC MACHINE.

SPECIFICATION forming part of Letters Patent No. 351,544, dated October 26, 1886.

Application filed May 1, 1886. Serial No. 200,777. (No model.)

*To all whom it may concern:*

Be it known that I, HENRY E. WALTER, a subject of the Queen of Great Britain, residing at Clifton, in the county of Richmond and State of New York, have invented a certain new and useful Improvement in Dynamo-Electric Machinery, of which the following is a specification.

My invention relates to combined dynamo-electric machines or generators and electro-dynamic motors, two independent continuous windings being placed upon the same armature and connected with separate commutators, one of which is for the motor-winding and the other for the generator. Machines of this general class have been proposed for the transmission of power electrically and for supplying current to electric lamps or other translating devices in local circuits. I am not aware, however, that it has been before observed that in machines of this class the neutral or non-sparking points on the commutators will be kept more nearly constant under variations of armature-current than in the ordinary machines with simple winding, by reason of the positive generator lead at commutator-brushes acting to neutralize the negative motor lead; but since there is a loss in conversion, the energy given off by the generator-coils will not be as great as that consumed by the motor-coils, and hence the neutralization will not be complete. Taking the case of an equal number of turns in each winding, the current must be greater in the motor-coils than in those of generator, as the electro-motive force of the generator is practically equal to the counter electro-motive force of the motor. Therefore there is more displacement of the magnetic poles of armature due to the motor-current than to the dynamo-current, and also more self-induction to overcome.

It is the object of my invention to produce a combined generator and motor of this character wherein both the magnetic displacement and self-induction of the two windings will be equal, and the neutral or non-sparking points will consequently be kept constant at both commutators, and this in general terms I accomplish by winding the motor-coils over an additional length of armature-core.

Figure 1:
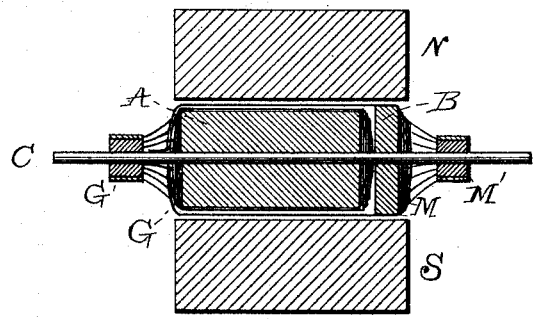
Figure 2:
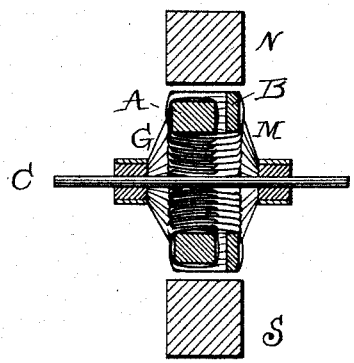
Figure 3:
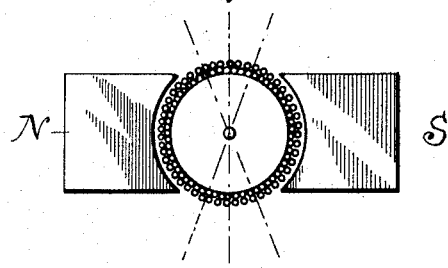

In the accompanying drawings, forming a part hereof, Figure 1 is a longitudinal horizontal section of a cylindrical armature and its windings and of the pole-pieces of the field-magnet; Fig. 2, a similar view showing the invention applied to a machine with ring-armature; and Fig. 3, a cross-section of the cylindrical armature and the magnet pole-pieces, with dotted lines indicating the displacement of the poles of armature due to the windings separately and the constant neutral line due to their combined action.

N S are the pole-pieces of field-magnet, forming the common field of force for both the generator and motor windings. The armature has a main magnetic core, A, and an auxiliary core, B. These are on the same shaft, C, and revolve together in the common field of force. The armature may be a cylindrical one, as in Figs. 1 and 3, or of ring form, as in Fig. 2, and the main and auxiliary cores are separated sufficiently to admit the wires of the generator winding between them. The generator-coils G are wound over the main armature-core only, as shown, and are connected to a commutator, G', at one end of the armature, while the motor-coils M are wound over both the main and auxiliary armature-cores, and are connected to a commutator, M', at the other end of the armature. Both these windings are continuous windings of the Siemens or Gramme type, such as are now generally employed in continuous-current machines.

By winding the motor-coils over an extra length of core, the counter electro-motive force of motor-winding will be made greater than the electro-motive force of generator-winding, and hence the generator-current will be increased and the displacement of armature-poles due to generator-winding will be increased. If this extra counter electro-motive force is made such as to give equal currents in both windings, there will still be a little displacement, due to the extra length of core alone, and this I obviate by making the auxiliary core approach the pole-pieces nearer than the main core, as shown in the drawings. In this way a greater intensity of magnetism is obtained at the auxiliary core, so that the extra counter electro-motive force gained is in excess of the displacement due to the extra length of wire—*i. e.*, that which is on the auxiliary core.

This larger diameter of auxiliary core gives also a good mechanical construction, since the generator-coils will fill out the main core to the size of the auxiliary core, and the motor-coils can then be wound evenly over both cores.

The same method of making both the magnetic displacement and self-induction of the generator and motor coils equal and opposite, so that the non-sparking point of the brushes will be constant, is applicable to combined machines with the same number of turns in the generator and motor windings, or with a greater number of turns in one winding than in the other, since any increase in the electro-motive force or counter electro-motive force of one winding gained by additional turns is attended by a corresponding decrease of current in the same winding.

What I claim is—

1. In a combined generator and motor, the combination, with the armature, of separate generator and motor windings having equal and opposite magnetic displacement and self-induction, substantially as and for the purpose set forth.

2. In a combined generator and motor, the combination, with main and auxiliary armature-cores, of two windings, one over the main core only and the other over both cores, substantially as and for the purpose set forth.

3. In a combined generator and motor, the combination, with main and auxiliary cores, the latter being in a more intense magnetic field than the former, of two windings, one over the main core only and the other over both cores, substantially as set forth.

4. The combination, with a common field of force, of main and auxiliary armature-cores, the latter of greater diameter than the former, and two armature-windings, one over the main core only and the other over both cores, substantially as set forth.

This specification signed and witnessed this 29th day of April, 1886.

HENRY E. WALTER.

Witnesses:
A. W. KIDDLE,
E. C. ROWLAND.